United States Patent
Steimle et al.

(10) Patent No.: US 7,471,333 B2
(45) Date of Patent: Dec. 30, 2008

(54) IMAGE SENSING DEVICE INTERFACE UNIT

(75) Inventors: Andre R. Steimle, Evyr (FR); Bernard Jung, Soisy sur Ecole (FR)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 10/906,333

(22) Filed: Feb. 15, 2005

(65) Prior Publication Data

US 2005/0212932 A1    Sep. 29, 2005

(30) Foreign Application Priority Data

Mar. 25, 2004   (EP) .................... 04368018

(51) Int. Cl.
  *H04N 5/225*   (2006.01)
(52) U.S. Cl. ............... 348/372; 713/601; 327/544
(58) Field of Classification Search .......... 348/308, 348/346, 333.1, 372, 207.99, 319, 312, 246; 455/343.1, 343; 395/550; 327/544
See application file for complete search history.

(56) References Cited

U.S. PATENT DOCUMENTS 5,452,434 A * 9/1995 MacDonald ............ 713/601
5,675,282 A * 10/1997 Saito ..................... 327/544
6,633,335 B1 * 10/2003 Kwon et al. ............ 348/308
6,900,837 B2 * 5/2005 Muramatsu et al. ...... 348/243
2005/0231620 A1 * 10/2005 Fraenkel et al. ......... 348/308

* cited by examiner

*Primary Examiner*—David Ometz
*Assistant Examiner*—Ahmed A Berhan
(74) *Attorney, Agent, or Firm*—Steven Capella

(57) ABSTRACT

The image sensing device interface unit attached to an image sensing device has dedicated means to detect a complete missing line and to perform clock gating of circuits for power management self-optimization. For each image frame, the time interval between start of line 1 and start of line 2 is computed and stored in a first register. The time interval between any other pair of two consecutive lines is also computed and stored in a second register. The stored values are compared, and if the value in the second register is greater than in the first register, a complete missing line has been detected and the gated clock used in said circuits is switched off for power saving. The interface unit can adapt to any type of sensor and does not require the help of any processor to perform the power saving function.

10 Claims, 4 Drawing Sheets

IMAGE SENSING DEVICE INTERFACE UNIT

BACKGROUND OF THE INVENTION

Field of the Invention

The present invention relates to the field of image processing and more particularly to an improved image sensing device interface unit wherein the power management is self-optimized. The present invention also concerns a method for the power management self-optimization of an image sensing device interface unit that is based on complete missing line detection. The image sensing device is typically a CMOS sensor.

Generally, most sensor interface units are specifically configured for one sensor or a very small set of similar sensors. A more versatile interface unit could be envisioned, but it would probably be built with several finite state machines (FSM), one FSM per type of sensor, in particular, because each sensor has its own image size and format. A universal interface unit that would allow the connection to almost all sensors commercially available on the market would be of course much appreciated, because it would be independent of the sensor in consideration making thereby the design of the color & format converter core block connected to it much easier.

The sensor and the interface unit are combined with other electronic parts in a camera. Because cameras are mobile objects, a major problem is power consumption that is a severe cause of limited use. Usually, the power management of the sensor interface unit is externally performed by a processor, microprocessor or central processing unit (CPU), depending on the application.

Therefore, a solution that would avoid the need of such an external processor and would be image size/format independent to perform the power management self-optimization of the sensor interface unit would be highly desirable.

SUMMARY OF THE INVENTION

It is therefore a primary object of the present invention to provide a method and system for self-optimizing the power management of a sensor interface unit.

It is another object of the present invention to provide a method and system for self-optimizing the power management of a sensor interface unit that is internally performed, thereby avoiding the need of an external processor (e.g. a CPU).

It is another object of the present invention to provide a method and system for self-optimizing the power management of a sensor interface unit that is based on complete missing line detection.

It is another object of the present invention to provide a method and system for self-optimizing the power management of a sensor interface unit that is based on the computation of the time interval required to process one complete line of pixels, so that it is totally independent of the image size/format, i.e. of the type of sensor.

It is still another object of the present invention to provide a method and system for self-optimizing the power management of a sensor interface unit by generating a clock gating signal that is capable to switch off all possible circuits thereof when there is no image transmission.

It is another object of the present invention to provide a method and system for self-optimizing the power management of a camera.

According to the present invention there is first described an improved image sensing device interface unit to interface an image sensing device and a color & format converter (20) that is capable to process the lines and pixels of an image comprising:

a control register to generate a set of control signals to adapt the image sensing device interface unit to the specific sensing device being used;

a clock signal generator configured to generate a first clock signal to be externally used for the synchronization of said image sensing device and a second clock signal to be internally used;

a data processing and synchronization circuit configured to receive the Start Of Frame signal, synchronization signals and data from the image sensing device and said second clock signal to generate regenerated Start of Frame, Start of Line, End of Line and Data Valid signals and corresponding data to the color & format converter;

a counter and comparator comprising:

a time interval counter for counting the time interval between the start of line 1 and the start of line 2 of a frame;

a time out counter for counting the time interval for any other pair of two consecutive lines and being reset at each start of a new line;

a first comparator for comparing the contents of time interval and time out counting means to generate a first interrupt signal, referred to as the 'missing line' interrupt if the time out value is greater than the time interval value and configured to apply said interrupt signal to the data processing and synchronization circuit which in turn generates a clock control signal; and clock gating signal generator connected to the clock signal generator which is configured to generate a gated clock signal derived from the second clock signal, that is used in the data processing and synchronization circuit and in the color & format converter as their current clock, the gated clock signal is switched off upon receipt of the clock control signal for power saving.

Still according to the present invention, there is further described a method for saving power consumption in an image sensing device interface unit and the color & format converter attached thereto comprising the steps of:

providing an image sensing device complying with any standard that sequentially generates image frames composed of lines formed by pixels;

connecting an interface unit provided with a time computer and a clock signal generator to said image sensing device;

computing the time interval between the start of line 1 and the start of line 2 for each frame referred to as the 'time interval';

computing the time interval between each pair of two consecutive lines referred to as the 'time out', so that if the 'time out' value is greater than the 'time interval' value, this means that a complete missing line of pixels has been detected; and if a complete missing line is detected, generating an interrupt clock signal that is able to switch off the clock signal that is currently used in the image sensing device interface unit and the color & format converter circuit for power saving.

As a result, the present invention is based on complete missing line detection to automatically perform the clock gating in a sensor interface unit for the power management thereof without help of a processor (hardware and software). On the other hand, because the power management is based on the time interval required to process one complete line of pixels, it is totally independent of the type of sensor for total power management self-optimization.

These and other aspects of the invention are described in further detail below.

DETAILED DESCRIPTION OF THE INVENTION

Figure 1:
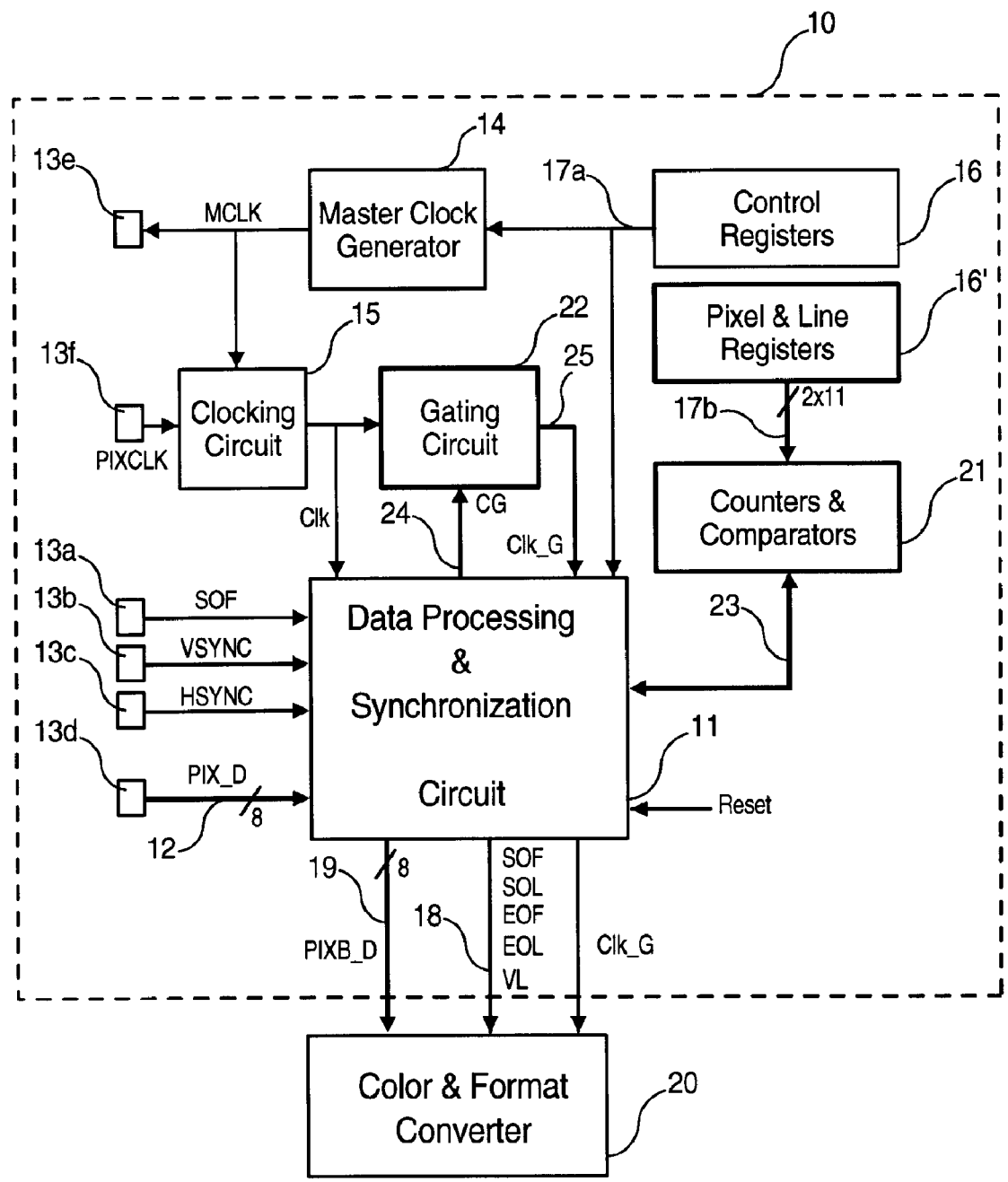
FIG. 1 schematically shows the block diagram of the improved sensor interface unit according to the present invention.

FIG. 1 schematically illustrates an overview of the block diagram of the improved sensor interface unit of the present invention referenced 10, wherein the innovative circuitry is shown in bold lines. Now turning to FIG. 1, in the described implementation, the sensor interface unit 10 is organized around the data processing and synchronization (DPS) block 11. DPS block 11 first receives three control signals labeled SOF (start of frame), VSYNC (vertical synchronization) and HSYNC (horizontal synchronization) and data bits labeled PIX_D transported on bus 12 (8-bit wide) from the sensor (not shown) via input terminals 13a, 13b, 13c and 13d respectively. A master clock generator 14 generates the master clock MCLK which is sent to the sensor via output terminal 13e and is also exploited internally in the sensor interface unit 10. As apparent in FIG. 1, this clock signal MCLK is applied to clocking circuit 15 which also receives clock signal PIXCLK from the sensor via input terminal 13f. Clocking circuit 15 generates a clock signal named Clk that is used in some blocks of sensor interface unit 10 and in particular in DPS block 11. Block 16 essentially consists of control registers that are configured by software. Block 16 is connected to the master clock generator 14 and to DPS block 11 via control lines 17a.

Among control signals transported on control lines 17a, signals En_M (enable mode), Sof_M (start of frame mode) and L_M (level mode) are important in that they make the distinction between the case where synchronization signals (e.g. VSYNC) are specifically used and the case where these signals are mixed with data and do not appear as such. In turn, DPS block 11 generates control signals: SOL (start of line), EOF (end of frame), EOL (end of line) and VL (valid data) and SOF', representing the regenerated SOF signal. These signals are output on control lines 18. In addition, DPS block 11 outputs data bits now labeled PIXB_D (correspond to data PIX_D after a certain delay) on data bus 19 (8-bit wide).

These control signals and data bits are applied to the color & format converter block 20. All the above description is related to the standard construction of a conventional interface unit that is placed between a sensor and the color & format converter core. The innovative part lies in the addition of blocks 16', 21 and 22 that will be now described in more details below. Note that, in essence, DPS block 11 is conventional, just a few minor hardware changes are needed to comply with the invention requirements. Block 16' holds pixel and line configuration registers that are still configured by software. Block 21, which contains counters and comparators, has the key role of performing complete missing line detection and optionally to detect errors in the images transmitted by the sensor.

Finally, block 22 is a clock gating circuit. Block 21 works with the pixel and line registers of block 16' via data bus 17b (2×11 bit wide) and exchanges control signals with DPS block 11 via control line 23. DPS block 11 generates a clock control signal CG that is applied to the gating circuit 22 via control line 24. Gating circuit 22 generates a clock signal, derived from clock signal Clk, that is referred to as the gated clock signal Clk_G. It is applied to the DPS block 11 via control line 25 and to the color & format converter block 20 (and to other blocks as well if so required) as their functional clock signal.

As it will be explained later on, when clock control signal CG is active (e.g. at the high logic level), i.e. when some determined process conditions are met, the gated clock signal Clk_G is switched off to save power consumption in blocks 11 and 20. The sensor produces the SOF control signal that is synchronized with the master clock signal MCLK delivered by the master clock generator 14. As a result, all the camera output data and control signals are synchronized with this master clock MCLK. However, for a camera compliant to the CCIR 656 standard, the SOF, VSYNC and HSYNC signals being not used, the sensor interface unit 10 only runs with the camera clock PIXCLK.

Figure 2:
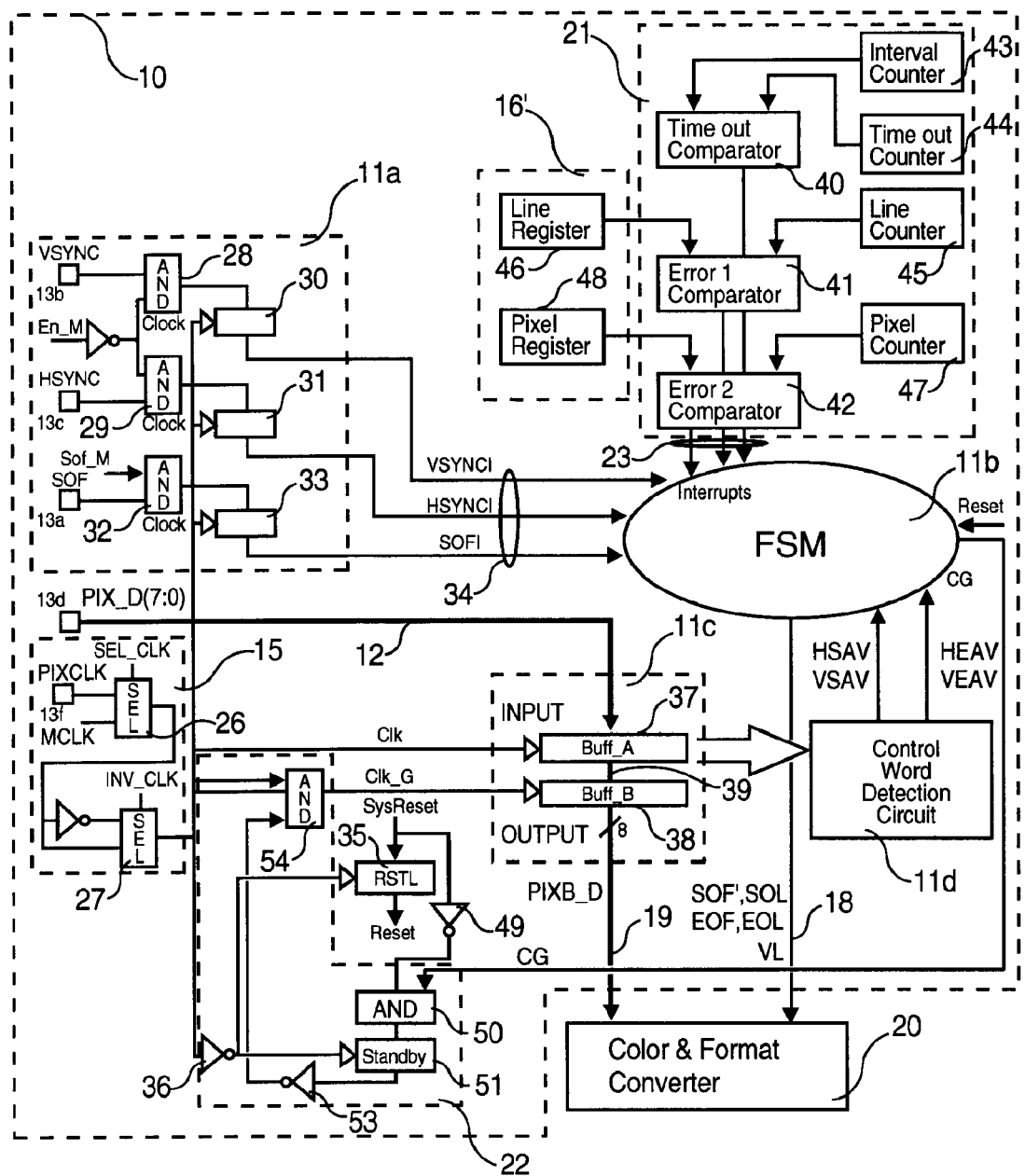
FIG. 2 schematically shows the details of the essential blocks composing the sensor interface unit of FIG. 1 and in particular the innovative circuit blocks.

FIG. 2 schematically shows the details of the essential blocks composing the sensor interface unit 10 of FIG. 1, i.e. conventional blocks 11, 14, 15 and 16 on the one hand and the innovative blocks 16', 21 and 22 on the other hand. Note that the DPS block 11 is now represented by four sub-blocks 11a to 11d. As mentioned above, block 16 includes a number of control registers that generate various signals such as En_M (enable mode), Sof_M (start of frame mode), L_M (level mode) and the like that are conventional control signals.

Now turning to FIG. 2, the right clock to match the interface unit 10 timing is selected by configuration bits SEL_CLK and INV_CLK in clocking circuit 15. The first one (SEL_CLK) selects either the master clock (MCLK) or the camera output clock (PIXCLK) via selector 26. The second one (INV_CLK) selects either the true or the complement of the selected signal in selector 27 to allow the sensor interface unit 10 to sample the data and control signals either on the rising edge or on the falling edge of this clock. To that end, the output of selector 26 is applied directly and through an inverter to selector 27. In turn, the signal that is output from selector 27 is the clock signal labeled Clk mentioned above that will be internally applied to a number of blocks/sub-blocks of interface unit 10. Clock signal Clk is first applied to sub-block 11a usually referred to as the interface signal/timing logic control (IS/TLC) circuit.

Control signals VSYNC and HSYNC are each ANDed with control signal En_M in AND gates 28 and 29, then the signals output therefrom are applied to D flip-flops 30 and 31 to generate signals VSYNCI and HSYNCI respectively. Likewise, control signal SOF is processed with the Sof_M signal in AND gate 32 and applied to D flip-flop 33 to generate signal SOFI. Signals applied to D flip-flops 30, 31 and 33 are launched on the rising edge of clock signal Clk. Control signals HSYNCI, VSYNCI and SOFI are applied to sub-block 11b which is a finite state machine (FSM) via control lines 34. In the described implementation, the FSM 11b has four states as it will be better explained later on in due course, however, it must be understood that other hardware implementations could be envisioned as well. Clock signal Clk is also used to generate the Reset signal that is applied to FSM 11b. To that end, the general system reset signal SysReset is applied to D flip-flop 35 so that it is launched therein on the falling edge of the Clk signal (complemented in inverter 36). The Reset signal is used as usual to reset the flip-flops at initialization.

Sub-block 11c comprises two buffers, input buffer 37 (Buff_A) and output buffer 38 (Buff_B) each consisting of eight D flip-flops (to match with the eight bits of the PIX_D data). Input buffer 37 is gated by clock signal Clk that is output from selector 27 and receives the PIX_D data via data bus 12 and input terminal 13d for sampling as standard. Output buffer 38 is used to store the PIXB_D data before they are sent to the color & format converter block 20 via data bus 19 to compensate latency problems between the data and the synchronization signals. Input buffer 37 is connected to sub-block 11d which is the control word detection circuit and to the output buffer 38 via data bus 39. Sub-block 11d generates signals HSAV (horizontal start active video), VSAV (vertical start active video), HEAV (horizontal end active video), and VEAV (vertical end active video) using the usual terminology. These four signals are applied to FSM 11b as standard. As explained above, depending upon the selected mode, either the VSYNCI, HSYNCI and SOFI or the VSAV, HSAV, HEAV, VEAV signals are used for synchronization purposes of the FSM 11b.

Innovative block 21 includes three comparators 40, 41 and 42. Time out comparator 40 compares the content of the interval counter 43 and time out counter 44. For each image frame, interval counter 43 counts the time interval between the start of line 1 and the start of line 2, and this value is frozen. It will be reset before the next image is processed. Time out counter 44 does the same job for each pair of two consecutive lines, e.g. between the start of line 4 and the start of line 5, as indicated by EOL (or EOF) control signal. If the time out is greater than the time interval value, this means that at least one complete line is missing. The role of comparator 40 is thus to detect when the time out is greater than the time interval. In this case, comparator 40 generates a first interrupt signal, referred to hereinbelow as the 'missing line' interrupt.

Error comparator 41 compares the content of line counter 45 (which holds the number of lines per frame) and line register 46 (in block 16') to identify a first type of errors (Error 1). Error comparator 42 compares the content of pixel counter 47 (which holds the number of pixels per line) and pixel register 48 (in block 16') to identify a second type of errors (Error 2). Comparators 41 and 42 are optional circuits that are dedicated to detect errors and/or anomalies in the image transmitted by the camera to generate interrupt signals of "error" type. The three signals that are output from comparators 40, 41 and 42 are applied as interrupt signals to FSM 11b via control lines 23. On receipt of any interrupt signal, the FSM 11b generates the EOF pulse which is sent to the color & format converter block 20 on control lines 18 and a clock control signal labeled CG to the gating circuit 22 that remains active until the next frame is received. Note that FSM 11b also generates other control signals (not shown) that are sent to block 21 to initiate the comparisons whenever necessary.

As apparent in FIG. 2, in addition to signal EOF mentioned above, the FSM 11b generates the control signals SOF, SOL, EOL and VL as standard, but according to the present invention, it further generates this additional clock control signal CG responsive to any of said interrupt signals. The generation of clock control signal CG will be explained in details later on by reference to FIGS. 3 and 4. The FSM 11b controls the counters and comparators in block 21 and validates the active pixel data for the color & format converter block 20 by means of just one control line, i.e. VL (data valid).

In essence, block 21 computes the time interval between the two first lines and the time interval between two consecutive lines, referred to as the time out, for each image frame, and if the time out is greater than the time interval, it generates the 'missing line' interrupt signal mentioned above. This signal will force the FSM 11b to jump into a state, referred to hereinbelow as the STANDBY (SDBY) state which is specific to the present invention. In turn, this SDBY state will generate the CG clock control signal that is exploited in the gating circuit 22 to switch off the gated clock signal Clk_G (used in blocks 11 and 20 as the current clock signal). Clock control signal CG is thus crucial to the implementation of the power management self-optimization of the present invention.

Signal SysReset is complemented in inverter 49 and applied to a first input of a two-way AND gate 50 which receives the clock control CG signal on its other input. The signal that is output from AND gate 50 is launched in D flip-flop 51 on the rising edge of the clock signal Clk (once inverted in inverter 36). The signal output from buffer 51 is complemented in inverter 53 then applied to a first input of two-way AND gate 54 which receives the Clk clock signal on its other input. Gated clock signal Clk_G is delivered at the output of AND gate 54. The particular construction of block 22 allows not to switch off clock Clk_G, so that during the general reset step, D flip-flops and latches are reset. Output buffer 38 which is normally gated by the clock signal Clk in the prior art implementation, is now gated by this gated clock signal Clk_G according to the present invention. The data PIX_D bufferized in buffer 38 are output as data PIXB_D on data bus 19 (8 bit wide).

Figure 3:
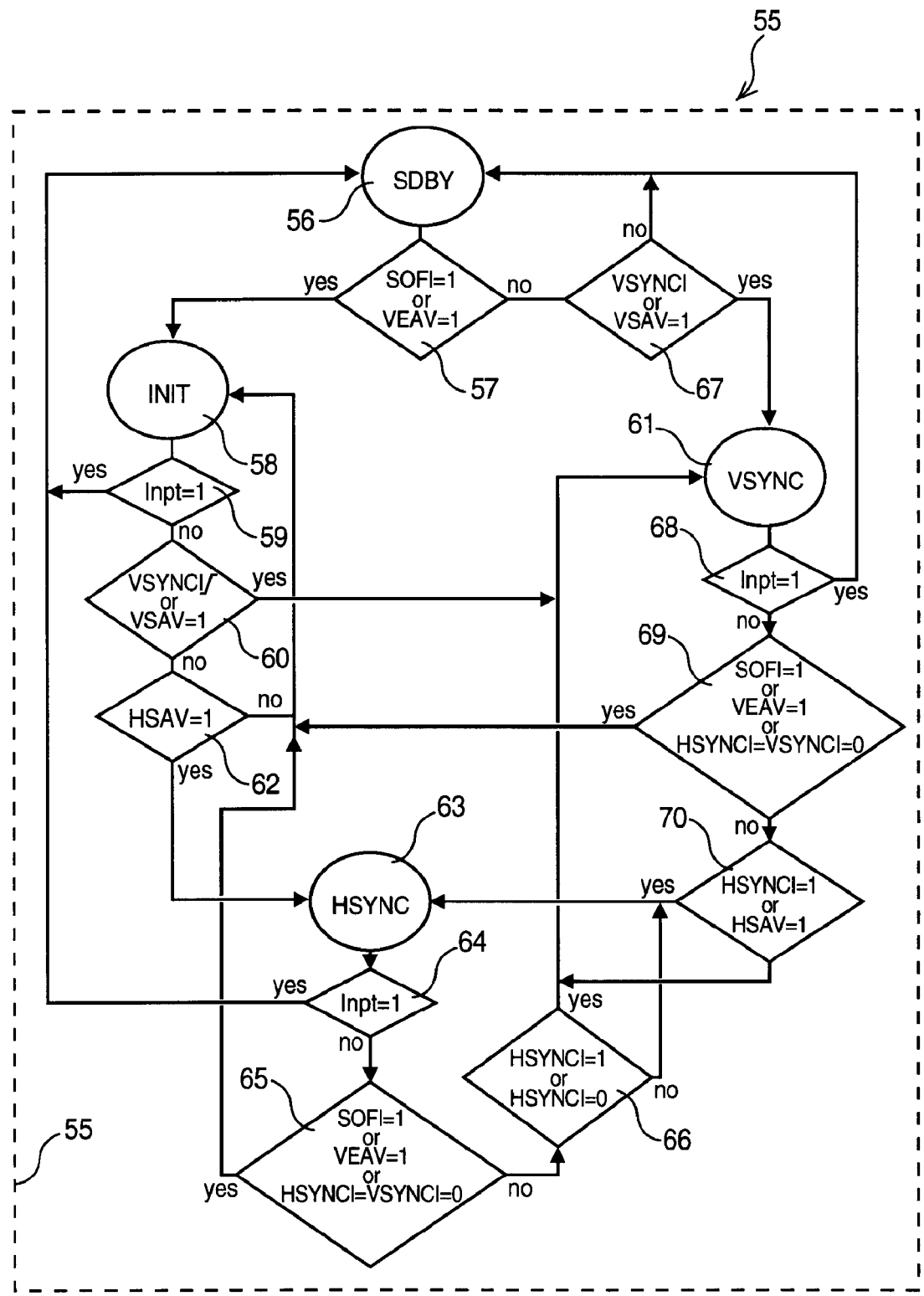
FIG. 3 is the flow chart showing the algorithm at the base of the method of the present invention to describe the operation of the finite state machine (FSM) depicted in FIG. 2, assuming it has four states.

FIG. 3 shows the flow chart referenced 55 of the algorithm at the base of the method of the present invention. This algorithm deals with either synchronization mode, irrespective the synchronization is performed with VSYNCI, HSYNCI and SOFI or with HSAV, VSAV, HEAV and VEAV signals. As sake of illustration, that are labeled INIT, SDBY, VSYNC and HSYNC. Note that, at the beginning of a frame, the time interval between line 1 and line 2 is computed by the interval counter under the control of states VSYNC and HSYNC.

Now turning to FIG. 3, at initialization, the FSM 11b is reset by the signal Reset (derived from signal SysReset). This state is referred to as the stand-by state SDBY (box 56). A first test is performed (box 57) to determine whether either signal SOFI or VEAV is active, if "yes", the FSM 11b goes to a state labeled INIT (box 58) and is now ready to process the frame to come. Now, a test is performed (box 59) to determine if either one of the three interrupt (Intpt) signals is active (Intpt=1). If "yes", the FSM 11b is set in the SDBY state, and if "no", another test is performed (box 60). If VSYNCI or VSAV=1, the FSM 11b is set in state VSYNC (box 61). If VSYNCI or VSAV does not equal 1, an additional test is performed (box 62). This latter test consists to determine whether HSAV=1, if "no" the FSM 11b returns to the INIT state and if "yes", the FSM 11b goes to the HSYNC state (box 63). This state is rather dedicated to handle the pixels and the FSM 11b remains in this state as long as signal HSYNC or HSAV remains active. As soon as an interrupt is detected (box 64), the FSM 11b returns to the SDBY state, if no interrupt is detected, a test is performed (box 65). If signal SOFI or VEAV is active or signals HSYNCI and VSYNCI are inactive, the FSM 11b returns to the INIT state, on the contrary, another test is performed (box 66). If signal HEAV is active or signal HSYNCI is inactive, the FSM 11b goes to VSYNC state, and to the HSYNC state if neither condition is met.

If the result of the test performed in box 57 is "no", an additional test is performed (box 67) to determine whether signal VSYNCI or VSAV is active, i.e. =1, if "no" the FSM 11b goes to the SDBY state and if "yes" to the VSYNC state. This latter state is operative after each line of pixels has been processed and remains as such in waiting the next one. As a consequence, a test is performed to determine whether an interrupt is detected (box 68). If "yes" the FSM 11b returns to the SDBY state and if "no", a test is performed (box 69). If signal SOFI or VEAV is active or signals HSYNCI and VSYNCI are inactive, the FSM 11b returns to the INIT state. If none of those conditions is met, a last test is performed (box 70). If signal HSYNCI or HSAV is active, the FSM 11b goes to the HSYNC state, otherwise it goes to the VSYNC state. As a final result, every time an interrupt signal is detected, the FSM 11b is set in the SDBY state and the gating signal CG mentioned above is made active and sent to the gating circuit 22 (see FIG. 2) to generate the gated clock signal Clk_G.

Figure 4:
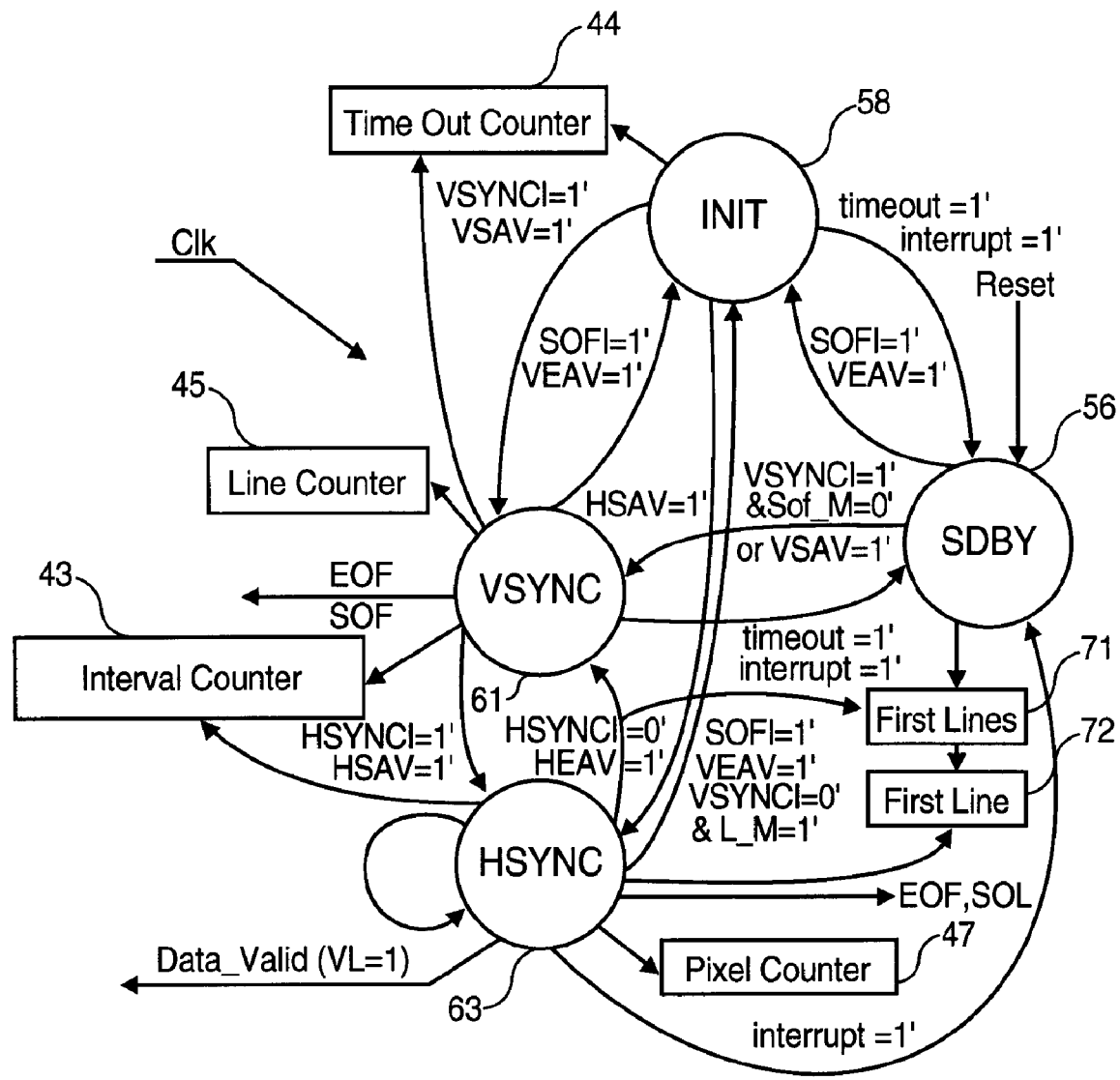
FIG. 4 is another view, more synthetic, of the operation of the finite state machine depicted in FIG. 3.

FIG. 4 shows a more synthetic representation of the FSM 11b operation. Since they are only four states in FSM 11b, two additional D flip-flops are required to control the (time) interval counter 43, referred to hereinbelow as the "first lines" 71 and the "first line" 72 flip-flops. They are set and reset as it will be now explained.

1-State SDBY:
In this state, the 'first lines' flip-flop is set.

2-State VSYNC:
When this state is entered for the first time from the INIT or SDBY state, the interval counter 43 is not running because the flip-flop 'first line' has not yet been set (it is set in state HSYNC). The FSM 11b waits until HSYNCI(HCLK) or HSAV signal is detected high, i.e. at '1' and on the rising edge of the Clk clock, the FSM 11b jumps into the HSYNC state.

3-State HSYNC:
When this state is entered and the 'first lines' flip-flop is high, the 'first line' flip-flop is set high, the 'first line' flip-flop is set high and then, the interval counter 43 counts the Clk clock cycles during the time the FSM 11b stays in this state. When the HSYNCI signal returns to '0' or when the HEAV signal is detected active, the FSM 11b returns to the VSYNC state.

4-State VSYNC:
When the VSYNC is entered from the HSYNC state, the 'first lines' flip-flop is reset to '0'. The interval counter 43 counts the Clk clock cycles during the time the FSM 11b stays in this state and the 'first line' flip-flop is high. On the same event as previously explained, the VSYNC state is left for the next HSYNC state.

5-State HSYNC:
When the 'first lines' flip-flop is reset to the low logical level, the 'first line' is reset to '0'. The interval counter is frozen since the 'first line' flip-flop is low, i.e. set to '0'. This counter then holds the time interval value between two consecutive lines. Once all lines have been received, the HSYNC state is left for the INIT state and then the EOF signal is set to '1', or the VSYNC is entered again when there is no indication of an end of frame.

6.1-State INIT:
In state INIT, the interval counter is running as long the FSM 11b stays in this state, i.e. that this counter counts the Clk clock cycles starting from the end of the frame as long as no VSYNC or VSAV signal is received. If the INIT state is left for the VSYNC state, the time out counter 44 is reset to '0'. This counter is compared to the interval counter 44 when the flip-flops 'first lines' and 'first line' are low and as soon as the content of the time out counter oversteps the one of the interval counter, the FSM 11b jumps into the SDBY state (in this state, the Clk clock signal is switched off for power saving). Normally, if at the end of a frame, the content of the line counter 45 is not equal to the value stored in the line register 46, the interrupt signal corresponding to a missing line is set to '1' or the interrupt signal corresponding to a line in excess is set to '1'.

6.2-State VSYNC
As in the INIT state, the time out counter 44 is running as long the FSM 11b stays in this state. That means this counter counts the Clk clock cycles starting from the end of line as long as no HSYNCI or HSAV signal is received, in which case, the HSYNC state is entered and the time out counter 44 is reset to '0'. This counter is compared to the interval counter 43 when the flip-flops 'first lines' and 'first line' are low and as soon as the content of the time out counter 44 oversteps the one of the interval counter 43, a 'missing line' interrupt is raised when the EOF signal has not been set to '1', otherwise, i.e. when the EOF signal has been detected active, the FSM 11b just jumps to the SDBY state where the Clk clock signal is switched off for power saving. It is to be noted that for any interrupt, the FSM 11b jumps into the SDBY state as soon as the Clk clock is switched off, so that the frame will be no longer processed. Even in the case where an EOF signal has been detected active and the sensing device sends picture after picture (no continuous video stream), the FSM 11b waits in the INIT state until the time out value is reached because the color & format converter block 20 starts the conversion Bayer RGB to RGB 24 bits as soon as the first line has been received. That means this block 20 which runs with the same gated clock, i.e. Clk_G, as the interface unit 10 can only be switched off after a time equivalent to one more line.

Figure 5:
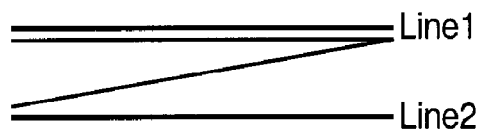
FIG. 5 illustrates the definition of the time interval according to the present invention which represents the duration between the start of line 1 to the start of line 2 of an image being processed.

FIG. 5 illustrates the definition of the time interval according to the present invention which represents the duration between the start of line 1 to the start of line 2 of an image being processed.

While the invention has been particularly described with respect to a preferred embodiment thereof it should be understood by one skilled in the art that the foregoing and other changes in form and details may be made therein without departing from the spirit and scope of the invention.

What is claimed is:

1. An improved image sensing device interface unit to interface an image sensing device and a color & format converter that is capable to process the lines and pixel of an image comprising:
a control register to generate a set of control signals to adapt the image sensing device interface unit to the specific sensing device being used;
a clock signal generator configured to generate a first clock signal to be externaly used for the synchronizaton of sad image sensing device and a second clock signal to be internally used;
data processing and synchronization circuit configured to receive a Start Of Frame signal, synchronization signals and data from the image sensing device and said second clock signal to generate regenerated Start of Frame, Start of Line, End of Frame, End of Line and Data Valid signals and corresponding data to the color & format converter;
the interface unit being characterized in that it further comprises:
counter and comparator comprising:
time interval counter for counting the time interval between the start of line 1 and the start of line 2 of a frame;

time out counting counter for counting the time interval for any other pair of two consecutive lines and being reset at each start of a new time;

first comparator for comparing values in the time interval and time out counters to generate a first missing tine interrupt signal if the time out value is greater than the time interval value and configured to apply said interrupt signal to the data processing and synchronization circuit which in turn generates a clock control signal; and clock gating signal generator, connected to said clock signal generator, which is configured to generate a gated clock signal derived from the second clock signal that is used in the data processing and synchronization circuit and in the color & format converter as their current clock, the gated clock signal being switched off upon receipt of the clock control signal for power saving.

2. The improved image sensing device interface unit of claim 1 further comprising:

a configuration register including line and pixel registers for storing a number of lines per frame value and a number of pixels per line value respectively.

3. The improved image sensing device interface unit of claim 2 further comprising:

a line counter and a pixel counter;

a second comparator for comparing the contents of said line counter and line register and generating an 'error 1' type interrupt signal if they are different; and a third comparator for comparing the contents of said pixel counter and pixel register and generating an 'error 2' type interrupt signal if they are different wherein said 'error 1 and error 2' type interrupt signals are processed as the missing line interrupt signal.

4. The improved image sensing device interface unit of claim 1 wherein said image sensing device is a CMOS sensor.

5. The improved image sensing device interface unit of claim 2 wherein said image sensing device is a CMOS sensor.

6. The improved image sensing device interface unit of claim 3 wherein said image sensing device is a CMOS sensor.

7. A method for saving power consumption in an image sensing device interface unit and the color & format converter attached thereto comprising the steps of:

providing an image sensing device complying with any standard that sequentially generates image frames composed of lines formed by pixels;

connecting an interface unit provided with time computer and a clock signal generator to said image sensing device;

computing the time interval between a start of line 1 and a start of line 2 for each frame;

computing the time interval between any other pair of two consecutive lines referred to as the time out value, so that if the time out value is greater than the time interval, this means that a complete missing line of pixels has been detected; and if a complete missing line is detected, generating an interrupt signal that is able to switch off a clock signal that is currently used in the image sensing device interface unit and the color & format converter circuit for power saving.

8. The method of claim 7 wherein said interrupt signal is first applied to a dedicated circuit to generate a clock control signal which is in turn applied to a clock gating circuit to switch off the clock signal.

9. The method of claim 7 wherein said image sensing device is a CMOS sensor.

10. The method of claim 8 wherein said image sensing device is a CMOS sensor.

* * * * *